United States Patent
Karunakaran

(10) Patent No.: US 9,729,551 B1
(45) Date of Patent: Aug. 8, 2017

(54) VIRTUAL MAILBOX

(71) Applicant: MOBILE IRON, INC., Mountain View, CA (US)

(72) Inventor: Kumara Das Karunakaran, San Jose, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

(21) Appl. No.: 14/550,962

(22) Filed: Nov. 22, 2014

Related U.S. Application Data

(60) Provisional application No. 61/909,327, filed on Nov. 26, 2013.

(51) Int. Cl.

| | |
|---|---|
| *H04L 29/06* | (2006.01) |
| *H04L 29/08* | (2006.01) |
| *H04L 12/58* | (2006.01) |
| *G06F 21/62* | (2013.01) |
| *H04W 12/08* | (2009.01) |
| *G06F 21/12* | (2013.01) |

(52) U.S. Cl.
CPC ............ *H04L 63/10* (2013.01); *G06F 21/121* (2013.01); *G06F 21/62* (2013.01); *G06F 21/6218* (2013.01); *H04L 51/22* (2013.01); *H04L 63/12* (2013.01); *H04L 63/20* (2013.01); *H04L 67/28* (2013.01); *H04W 12/08* (2013.01)

(58) Field of Classification Search
CPC ......... H04L 63/10; H04L 63/20; H04L 63/12; G06F 21/121; G06F 21/6218; G06F 21/62; H04W 12/08
See application file for complete search history.

(56) References Cited

U.S. PATENT DOCUMENTS

| | | | | |
|---|---|---|---|---|
| 8,341,749 | B2* | 12/2012 | Rogel ..................... | G06F 21/56 726/22 |
| 9,521,116 | B2* | 12/2016 | Durbin ................ | H04L 63/0272 |
| 2002/0198948 | A1* | 12/2002 | Lin ..................... | H04L 12/5835 709/206 |
| 2003/0224760 | A1* | 12/2003 | Day ...................... | H04L 12/585 455/412.1 |
| 2004/0064561 | A1* | 4/2004 | Parsons ............... | H04L 61/3015 709/226 |
| 2004/0162913 | A1* | 8/2004 | Halahmi .............. | G06Q 10/107 709/236 |

(Continued)

OTHER PUBLICATIONS

C. Li, A. Raghunathan and N. K. Jha, "A Trusted Virtual Machine in an Untrusted Management Environment," in IEEE Transactions on Services Computing, vol. 5, No. 4, pp. 472-483, Fourth Quarter 2012.*

(Continued)

*Primary Examiner* — Kari Schmidt
(74) *Attorney, Agent, or Firm* — Van Pelt, Yi & James LLP

(57) ABSTRACT

A request to provide mail to a mobile device is received at a proxy server associated with an email server. The proxy server generates a virtual mailbox for the mobile device based at least in part on the request. The virtual mailbox is stored in a location separate from the email server. The mobile device is provided access to the virtual mailbox. The virtual mailbox as presented on the mobile device includes attributes that are substantially similar to attributes of a mailbox associated with the email server.

22 Claims, 8 Drawing Sheets

(56) References Cited

U.S. PATENT DOCUMENTS

| | | | | |
|---|---|---|---|---|
| 2006/0020671 A1* | 1/2006 | Pike | | G06Q 10/107 709/206 |
| 2007/0180033 A1* | 8/2007 | Singh | | G06Q 10/107 709/206 |
| 2007/0233795 A1* | 10/2007 | Setlow | | H04L 12/5885 709/206 |
| 2008/0070495 A1* | 3/2008 | Stricklen | | H04W 8/22 455/3.01 |
| 2008/0155649 A1* | 6/2008 | Maler | | H04L 63/20 726/1 |
| 2010/0198928 A1* | 8/2010 | Almeida | | G06Q 10/107 709/206 |
| 2011/0225267 A1* | 9/2011 | Ohashi | | H04L 12/5895 709/219 |
| 2013/0042295 A1* | 2/2013 | Kelly | | G06F 21/53 726/1 |
| 2013/0055347 A1* | 2/2013 | Chawla | | H04W 12/08 726/3 |
| 2014/0032733 A1* | 1/2014 | Barton | | H04L 41/00 709/223 |
| 2015/0081764 A1* | 3/2015 | Zhao | | H04L 67/08 709/203 |

OTHER PUBLICATIONS

Garfinkel, Tal, et al. "Terra: A virtual machine-based platform for trusted computing." ACM SIGOPS Operating Systems Review. vol. 37. No. 5. ACM, 2003. pp. 476-479.*

K. Tewari, A. Joshi, S. Garg, R. H. Goudar and D. Bordoloi, "A resilient platform for safe execution of software inside a dynamic environment," 2013 7th International Conference on Intelligent Systems and Control (ISCO), Coimbatore, Tamil Nadu, India, 2013, pp. 476-479.*

* cited by examiner

VIRTUAL MAILBOX

CROSS REFERENCE TO OTHER APPLICATIONS

This application claims priority to U.S. Provisional Patent Application No. 61/909,327, entitled VIRTUAL MAILBOX filed Nov. 26, 2013 which is incorporated herein by reference for all purposes.

BACKGROUND OF THE INVENTION

In an enterprise mobile environment, mobile devices are typically provided controlled access to email and/or other network resources. For example, when a device and/or user is determined to be not compliant with an enterprise policy (e.g., the device is infected, not registered with a mobile device management (MDM) platform, etc.), it is common practice to block the mobile device from accessing email servers and/or other corporate resources. The device may also be quarantined. If, however, the mobile device user is not given appropriate notification and guidance to bring the device back to compliance and/or register the device, the user may become frustrated and initiate a call to an enterprise support desk.

A device which is blocked and/or quarantined also may be provided limited access to systems to guide and help the device owner restore the device to compliance. For example, if email is blocked to protect a non-compliant device from accessing enterprise email servers, enterprise email may not be used to guide or alert the users.

In some traditional systems, users may be notified through text messages or via push notifications that their device has been blocked. These notifications may carry a web link which can further take users through a web-based, potentially interactive guide. Users may, however, ignore and/or be confused by text messages and/or push notifications sent to the device, especially when multiple messages and/or notifications are sent to a device.

BRIEF DESCRIPTION OF THE DRAWINGS

Various embodiments of the invention are disclosed in the following detailed description and the accompanying drawings.

DETAILED DESCRIPTION

Figure 1:
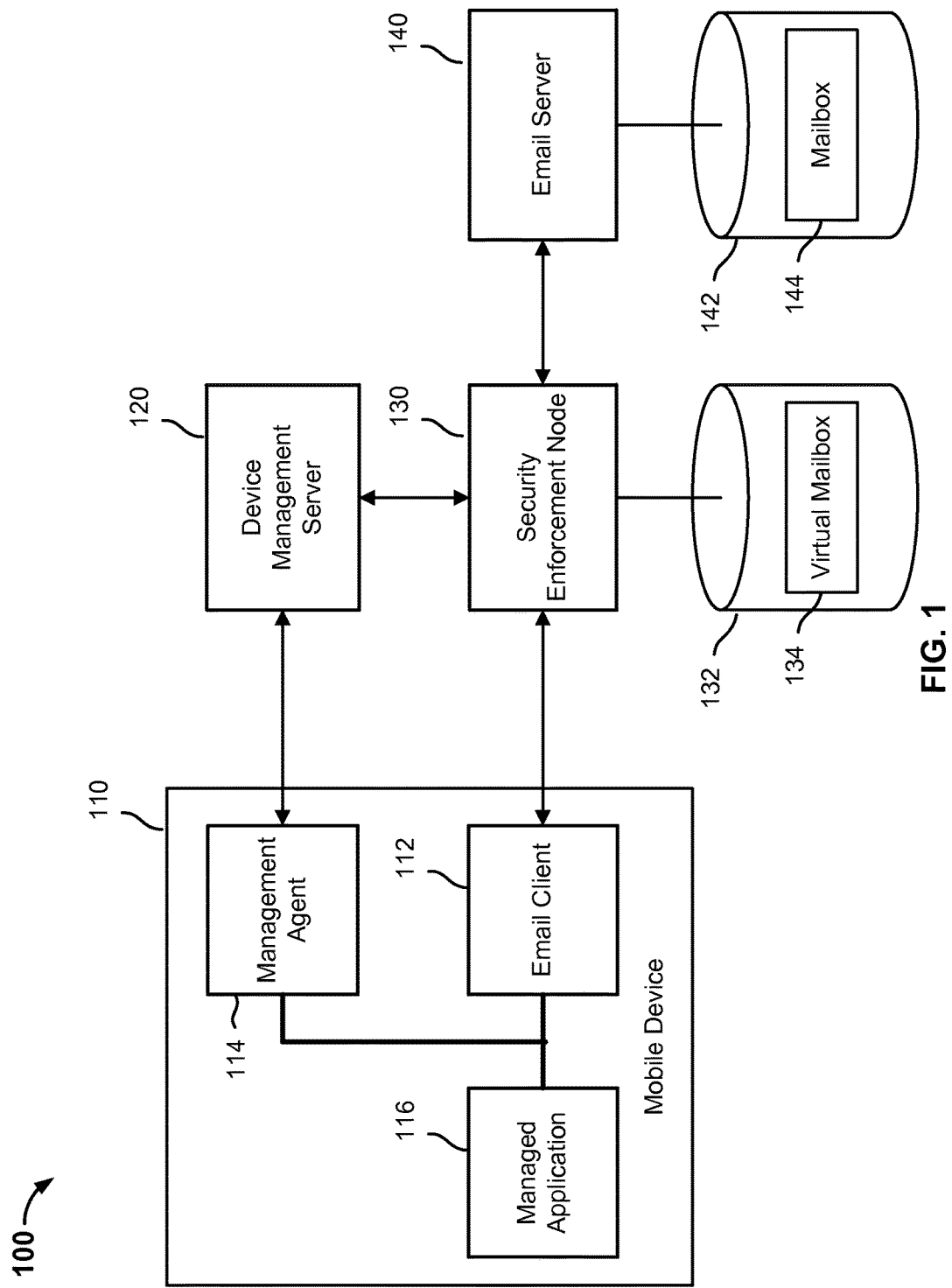
FIG. 1 is a block diagram illustrating embodiments of a system including a virtual mailbox.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A virtual mailbox is disclosed. In some embodiments, a virtual mailbox is generated for one or more mobile devices. In some cases, the virtual mailbox may be used to communicate with a mobile device user when the user's device is in a non-compliant state, when the device is not registered with an MDM platform, and/or in other situations. Because mobile device users tend to be comfortable with email and check email frequently, using email as a medium to alert, communicate with, and/or guide users may be more effectively than other communication approaches, such as push notifications, text messages, and/or other types of communications.

In various embodiments, a virtual mailbox is used to provide enterprise information to user, such as enterprise news, IT department information, and/or any other type of information. In certain cases, a mobile device is provided both an email server-associated mailbox (e.g., a regular mailbox) and a virtual mailbox. The virtual mailbox may be specific to a device and may be used by, for example, an administrator to provide information directly to a user on their preferred device. In some cases, a virtual mailbox is merged with an email server-associated mailbox.

In various embodiments, a request to provide mail to a mobile device is received at a proxy server associated with an email server. The proxy server generates a virtual mailbox for the mobile device based at least in part on the request. The virtual mailbox is stored in a location separate from the email server. The mobile device is provided access to the virtual mailbox. The virtual mailbox as presented on the mobile device includes attributes that are substantially similar to attributes of a mailbox associated with the email server.

FIG. 1 is a block diagram illustrating embodiments of a system including a virtual mailbox. In the example shown, a system 100 includes a mobile device 110, a device management server 120, a security enforcement node 130

(e.g., proxy server), and/or other components. The mobile device 110 may include a smartphone, tablet, and/or any other type of mobile device. The mobile device 110 may include an email client 112 (e.g., email application), a management agent 114, managed applications 116, non-managed applications (not shown), and/or other components. In certain cases, the mobile device 110 may be configured for operation in a MDM environment. In some cases the techniques disclosed herein are used to register a mobile device 110 in an MDM environment. The email client 112, managed applications 116, and/or other applications may include and/or be modified to include a library. The library may be, for example, compiled into the application, injected into the application, added to the application by wrapping, added as a software development kit (SDK), and/or otherwise added to an email client 112 and/or managed application 116. The library may configure the managed application 116 for use in an MDM environment by, for example, allowing the device management agent 114 to control the email client 112 and/or managed applications 116. In some embodiments, a library associated with an email client 112, email application, and/or other managed application includes a virtual mailbox library. The virtual mailbox library may configure the email client 112 and/or other email application to execute the techniques disclosed herein.

In various embodiments, the management agent 114, a platform management engine associated with the operating system of the device (not shown), and/or other components of the mobile device send security state information to the device management server 120. The security state information may include a device state (e.g., secure, unsecure, unsecure-jailbroken, etc.), application inventory information (e.g., a list of applications, an indication that malware is installed, etc.), policy enforcement state information (e.g., password policy enforcement state, etc.), and/or any other device state-related information. In various embodiments, the device management server 120 uses the security state information to determine a security posture of the mobile device 110. As discussed in detail below, the security posture of the device 110 may be used to determine whether to generate a virtual mailbox 134 and/or block access to the email server 140.

In various embodiments, the email client 112 and/or other email-related application (not shown) communicates with an email server 140 via a security enforcement node 130. The security enforcement node 130 may include a reverse proxy between the mobile device 110 and the email server 140, such as a backend email server, a configured corporate email server, and/or any other type of mail server. The email server 140 may be associated with an email data storage 142 including mailbox(es) 144 for the mobile device 110 and/or user associated with the mobile device. The security enforcement node 130 (e.g., proxy server) may include an engine which receives email protocol-related requests from the mobile device 110 and passes these requests on to the email server 140. The security enforcement node 130 may receive response(s) from the email server 140 and pass the response back to the mobile device 110. In certain cases, it is determined that the mobile device 110 is to be blocked from accessing the email server 140. In one example, it is determined at the device management server 120 that the security posture of the mobile device 110 violates a policy. In that case, the device management server 120 sends a command to the security enforcement node 130 to block access to the email server 140 and/or mailbox(es) 144 associated therewith. In another example, it is determined (e.g., by the security enforcement node 130, device management server 120, etc.) that the mobile device 110 is not registered with an MDM system. In that case, the mobile device 110 may be blocked from accessing the email server 140 until registered.

In traditional systems, when a mobile device 110 is blocked by the device management server 120, the security enforcement node 130 would send a classic hypertext transfer protocol (HTTP) response (e.g., "403 Forbidden"), a specific error status code as defined by an email protocol (e.g., the ActiveSync protocol), text message(s), push notification(s), and/or other messages to the mobile device 110. These messages may confuse the user and as a result may cause the user to call a support desk.

In some embodiments using the techniques disclosed herein, a virtual mailbox 134 is generated for the mobile device 110. The virtual mailbox 134 may be stored in a data storage 132 that is separate from the email server 140. In some cases, a virtual mailbox is generated as a synthetic data storage and/or using synthetic data storage techniques. In one example, the virtual mailbox 134 is generated in such a manner that there is no persistent store and/or database entry in memory, rather just a state in memory that synthetically creates the virtual mailbox 134. In other cases, the virtual mailbox 134 is stored as an Exchange Database (EDB) file and/or other email database-related file. In various embodiments, the virtual mailbox 134 is isolated, quarantined, and/or otherwise separated from the email server 140. The data storage 132 including the virtual mailbox 134 may include a data storage 132 associated with the security enforcement node 130, and in some cases, the data storage 132 has no access to the email server 140. In various embodiments, the security enforcement node 130 generates the virtual mailbox 134. The security enforcement node 130 may act as an email backend server for the virtual mailbox 134. In acting as and/or simulating an email server, the security enforcement node 130 may perform any of the operations typically performed by an email server, such as email server 140. For example, the virtual mailbox 134 may be generated, managed, synchronized, and/or otherwise maintained using any features and/or functionality of an email protocol, such as Exchange ActiveSync and/or any other email-related protocol.

In various embodiments, the virtual mailbox 134 may be used as a medium for an enterprise to communicate with a user. In one example, an enterprise may use a virtual mailbox 134 to communicate with a user of a mobile device 110 by providing messages to the virtual mailbox 134 while a device is an unsecure state. In another example, an enterprise provides messages to the virtual mailbox 134 to guide a mobile device user to register the device 110 in an MDM program. Registration information including, for example, links to automatically register the device with the device management server 120 may be provided in an email message sent to the virtual mailbox 134. In a further example, the virtual mailbox 134 is used to provide other types of information to a mobile device user. For example, a network-based very important person (VIP) folder may be generated for a user in a virtual mailbox 134, and an enterprise may use the VIP folder to provide user-specific messages to the user. In another example, a files folder is generated in a virtual mailbox for a user and/or user's device. An enterprise may provide any type of files to the folder, and the mobile device user may access the folder in the virtual mailbox to retrieve the files.

In some embodiments, the contents of the virtual mailbox 134 are dynamic. In certain cases, content in the virtual mailbox 134 may change as dependent states change. For example, the contents of the virtual mailbox 134 (such as email messages, files, calendar entries, notes, links to directory resources, and/or other contents) may change based on a passage of time, device posture, user activity, and/or any other factors.

According to some embodiments, a mobile device management server 120 configures a special synthetic email account on the device 110, and the security enforcement node 130 may present a virtual mailbox for that account. Using these techniques, a mobile device user is provided two accounts on the same device—an enterprise user account and a generic/synthetic MDM user account. From the perspective of the email client 112, both accounts are provisioned by the mobile device management server 120. In certain cases, the MDM account may be available only after the device 110 is registered to the device management server 120. In one example, the MDM email account (e.g., the virtual mailbox) may include any of the functionality disclosed herein without interacting with the enterprise mailbox 144.

Figure 2:
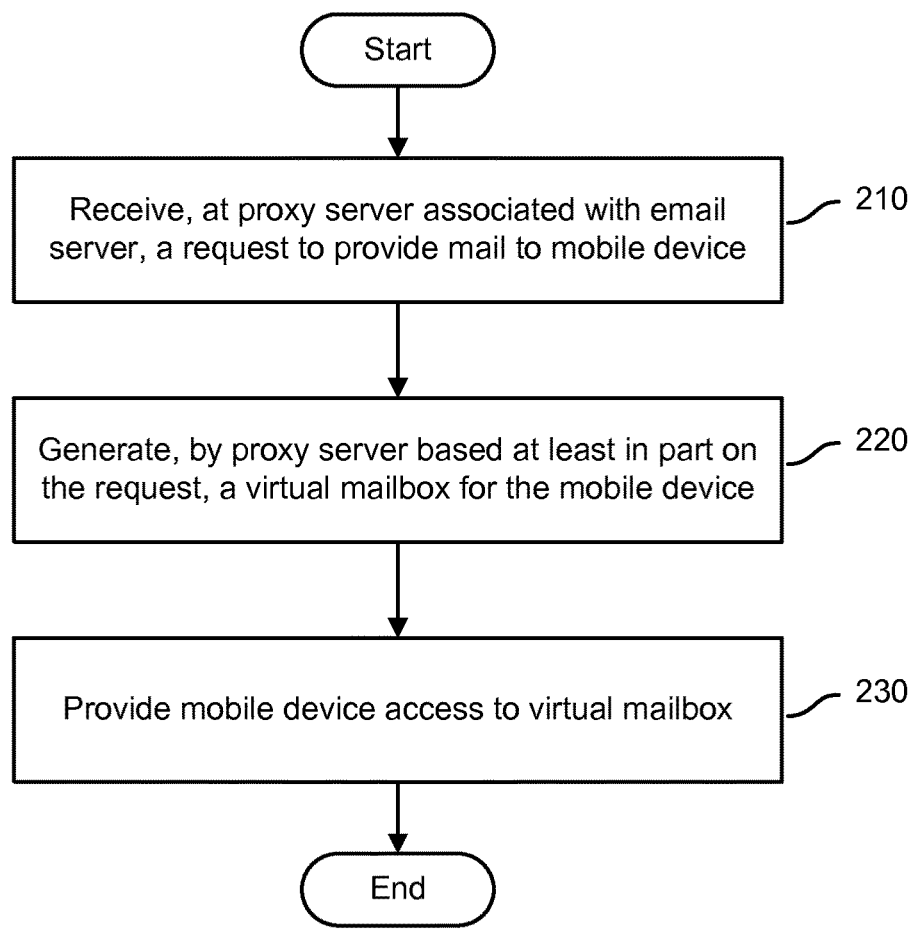
FIG. 2 is a flowchart illustrating embodiments of a process to generate a virtual mailbox.

FIG. 2 is a flowchart illustrating embodiments of a process to generate a virtual mailbox. In various embodiments, the process 200 is performed at security enforcement node 130 (e.g., proxy server) of FIG. 1. At 210, a request to provide mail is received at a proxy server associated with an email server. In various embodiments, the request to provide mail is received from a mobile device, an email client associated with a mobile device, and/or component associated with a mobile device. The request to provide mail may include any email protocol-related request from the mobile device sent to the email server via the proxy. An email protocol-related request may include, for example, a request to retrieve mail from an email server, a request to synchronize an email client with an email server, an outgoing email, and/or any other request. In traditional operation, the proxy may be configured to pass the email protocol-related request to the email server. Using the techniques disclosed herein, the proxy may verify the security posture and/or other parameters associated with the device and/or device user prior to passing the request to the email server. In one example, the proxy server communicates with a device management server to validate a security posture of the mobile device. In certain cases, the device management server may determine based on a security posture of the mobile device that the mobile device is to be blocked access to the email server and/or other network resources. The device management server may send a command to the security enforcement node to generate a virtual mailbox and/or block the mobile device access to the email server. This command may include, for example, a request to provide mail.

In various embodiments, a request to provide mail is received at the proxy server from a device management server. In some cases, a request to provide mail includes a request to generate a virtual mailbox for the mobile device. In one example, a request to generate a virtual mailbox for the device is sent from the mobile device management server to the proxy server based on a determination that a security posture of the device is not compliant with a security-related policy applicable to the device. In another example, the device management server sends a request to generate a virtual mailbox based on a determination that a network-based folder is to be generated for a user of the mobile device. A network-based folder may include a VIP folder generated for a mobile device user, a files folder to deliver files to the user from a network share that is mapped by the administrator, and/or another folder.

At 220, a virtual mailbox is generated for the mobile device. A virtual mailbox may be generated by a proxy server based on a request from the mobile device to provide mail, in response to a request to generate a virtual mailbox (e.g., from a device management server), and/or based on any other email-related request. In some embodiments, a virtual mailbox is generated and/or stored at a location separate from the email server. The virtual mailbox may be generated by the proxy server and/or stored in a data storage associated with the proxy server. In certain cases, the proxy server and/or a server associated with the proxy server (e.g., other than email server) may function as an email server for the virtual mailbox. For example, the proxy server may provide any of the functionality in conjunction with the virtual mailbox that an email server would typically provide in conjunction with a traditional mailbox.

At 230, the mobile device is provided access to the virtual mailbox. In various embodiments, the proxy server points the mobile device email client to the virtual mailbox. For example, prior to deployment of the virtual mailbox the proxy server may point the mobile device email client to a mailbox associated with the email server, and after deployment of the virtual mailbox the mobile device email client is pointed to the virtual mailbox. In some embodiments, the mobile device is blocked from accessing the email server and/or other network resources. In this case, content included in a mailbox associated with the email server is removed from the email client and content associated with the virtual mailbox is added to the email client, for example, upon synchronization between the email client and the virtual mailbox.

In various embodiments, a virtual mailbox as presented on a mobile device includes similar (e.g., the same) attributes to a mailbox hosted by an email server. The virtual mailbox may, for example, appear to be identical to a traditional mailbox associated with an email server. The virtual mailbox may include any of the display attributes, functionality, and/or other attributes of a traditional mailbox. In one example, the virtual mailbox is displayed in an email client including an inbox, outbox, sent mail folder, trash, one or more folders (e.g., generated by a user), and/or other elements. In some cases, the virtual mailbox may include attributes that are customized to the mobile device, the user of the mobile device, and/or the email client in which the mailbox is displayed. In one example, the virtual mailbox is configured to exhibit attributes associated with a user's group membership, locality, device type, language preference(s), and/or other parameters. In another example, a user may configure a mail client on a device to exhibit certain attributes, such as an order in which folders are displayed, colors, font sizes, and/or other attributes. And the same attributes may be applied to the virtual mailbox.

Figure 3:
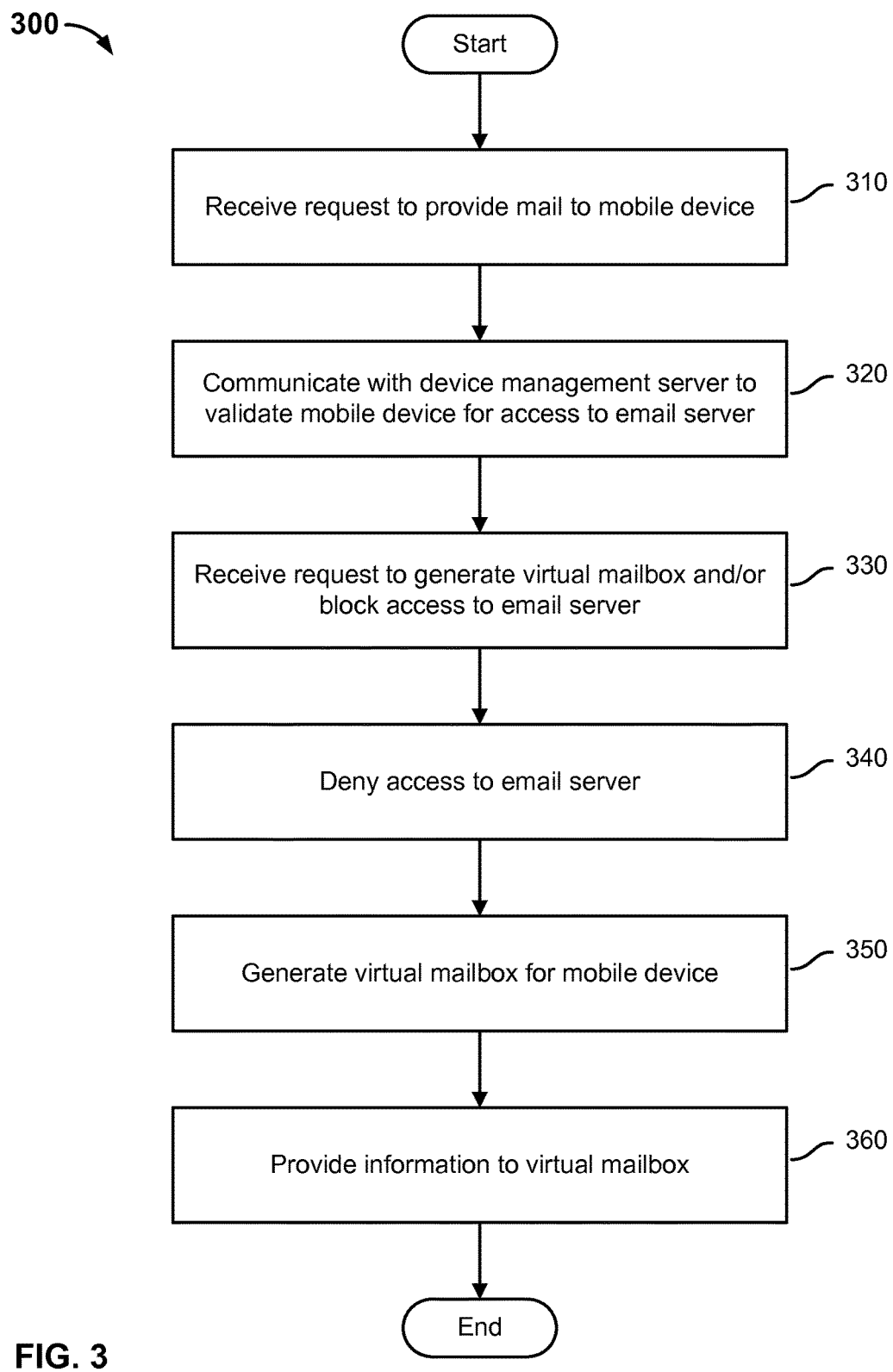
FIG. 3 is a flowchart illustrating embodiments of a process to generate a virtual mailbox for a mobile device.

FIG. 3 is a flowchart illustrating embodiments of a process to generate a virtual mailbox for a mobile device. In various embodiments, the process 300 is performed at security enforcement node 130 of FIG. 1. At 310, a request to provide mail to a mobile device is received. In various embodiments, the request to provide mail is received at a proxy server from a mobile device, an email client associated with a mobile device, and/or component associated with a mobile device. The request to provide mail may include an email protocol-related request from the mobile device sent to the email server via the proxy.

At 320, a proxy server communicates with a device management server to validate the mobile device for access to email server. In various embodiments, the proxy server communicates with the device management server based on the request for mail received from the mobile device. In certain cases, the proxy server communicates with the device management server to validate the mobile device each time the mobile device attempts to connect to the email server (e.g., to retrieve mail, refresh an inbox, synchronize the mailbox, etc.). In some cases, the proxy server communicates with the device management server periodically to validate the mobile device. For example, the proxy server may query the device management at set intervals (e.g., hourly, daily, etc.) to validate the mobile device.

In various embodiments, a mobile device management server determines the security posture of the mobile device and allows and/or blocks the device based on the security posture. A mobile device management server may, for example, determine a security posture of the mobile device based on state information received from a management agent on the device, a platform management agent associated with the device operating system, and/or other components. In one example, a mobile device management agent sends state information (such as device is secure, device is jailbroken, device in unstable, device in a certain configuration, device is compliant with certain policies, and/or any other device state information) to the device management server. In another example, a platform management engine sends state information including application inventory information (such as a list of applications installed on the device, information identifying any unauthorized applications on the device, etc.), policy enforcement state information (such as a list of policies applicable to the device, whether the policies have been violated, etc.), and/or other state information. In various embodiments, the device management server uses the state information received from the mobile device to determine a security posture for the mobile device. A mobile device security posture may be, for example, determined based on the application of rules and/or policies to the state information. Rules and/or policies may, for example, define for a mobile device and/or application state a security posture to be applied to the device. In one example, state information received from a platform management engine includes application inventory information indicating that the mobile device includes one or more unauthorized applications. In this case, the device security posture may be set to, for example, "unsecure-unauthorized applications installed." In a further example, state information may indicate that the operating system on the device is not the latest version, and the security posture of the device may be determined, based on, for example, the application of one or more rules, to be "not compliant—old OS installed." The above examples illustrate several possible device security postures, but these examples are not an exhaustive list of all possible security postures contemplated by the present disclosure.

At 330, a request to generate a virtual mailbox and/or deny access to the email server is received at the proxy server. According to various embodiments, the device management server determines that the security posture of the mobile device violates one or more rules and/or policies. Based on the determination, the device management server sends a command to the proxy server to generate a virtual mailbox and/or block the mobile device from accessing the email server and/or other network resources. The command is received at the proxy server. In some cases, the request to block access and/or generate the virtual mailbox is received in response to a communication from the proxy server to the device management server regarding the security posture of the mobile device. In other cases, the device management server generates the request to block access and/or generate the virtual mailbox based on a change in the security posture of the device to a non-compliant state.

In some embodiments, a request to generate a virtual mailbox and/or deny access to the email server may be temporary. For example, when a mobile device is first used in an MDM environment and/or has not been used in the MDM environment for a certain period of time, it may take several minutes for a device management server to complete a posture check on the device. In traditional systems, a device may be either allowed access, which could be bad for security, or blocked with no feedback, which may be bad for user experience and may lead to help desk support calls. Using the techniques disclosed herein, a virtual mailbox may be deployed to indicate to the user to wait until the posture check is completed.

At 340, the mobile device is denied access to the email server. In various embodiments, the proxy server denies and/or blocks the mobile device and/or email client access to the email server. Access may be denied by, for example, blocking any messages sent to the email server, blocking the email client from retrieving messages from the email server, and/or otherwise denying the mobile device from communicating with the email server. In certain cases, a mobile device is allowed access to certain features and/or functionality associated with an email server while being denied access to other features and/or functionality. For example, a mobile device is allowed access to a user's calendar and denied access to email, notes, and/or other functionality. In some cases, the mobile device may be denied access to other network resources.

At 350, a virtual mailbox is generated for the mobile device. In some embodiments, the proxy server generates the virtual mailbox and stores the virtual mailbox in a storage associated with the proxy server. The proxy server may redirect the mobile device email client from a mailbox associated with the email server to the virtual mailbox associated with the proxy server. The proxy server may simulate the behavior, functionality, and/or other attributes of the email server. In various embodiments, the proxy server does not communicate with the email server when the device is in a blocked state. The proxy server may only communicate the mobile device simulating the behavior of the email server by providing access to the virtual mailbox.

At 360, information is provided to the virtual mailbox. In various embodiments, a device management server and/or proxy server provides information to the virtual mailbox. In some cases, messages may be delivered by the device management server to the proxy server as part of the signal to block the device and/or generate the virtual mailbox for the mobile device. Information provided to a virtual mailbox may include, for example, email messages, alerts, reminders, calendar entries, and/or other information. In some cases, an email message is provided to the virtual mailbox, and the email indicates a reason that the mobile device has been blocked from accessing the email server and/or other network resources. In one example, an email message states the mobile device has been blocked from accessing the email server and/or other network resources because an unauthorized application is installed on the device, the device operating system is not the latest version, the device is jailbroken, and/or any other reason that the device security posture is not compliant. In certain cases, an email and/or other type of message is provided to the virtual mailbox that describes the steps necessary to recover the device from the blocked state. In one example, an email and/or other message may provide steps to guide a user to remove an unauthorized application from a device, update the device operating system, recover the mobile device from a jailbroken state, and/or a perform other operations to bring the device into a compliant security posture. In certain cases, once a user completes steps included in an email and/or other message, the virtual mailbox may be updated with further emails and/or messages indicating next steps, feedback based on the user's completion of the steps (e.g., an indication that device is now compliant), and/or other information. In some embodiments, messages may be generated from a template including, for example, languages, formats, and/or styles associated with a user of the mobile device. In one example, a template is used to generate an email and/or attachments including step-by-step instructions to bring the mobile device into a compliant state. In some cases, reminders and/or calendar entries are provided to the virtual mailbox. In one example, reminders and/or calendar entries are added to the virtual mailbox by the device management system and/or proxy server. The reminders and/or calendar entries may remind the user to take remediation actions to restore the mobile device to a compliant security posture.

Figure 4:
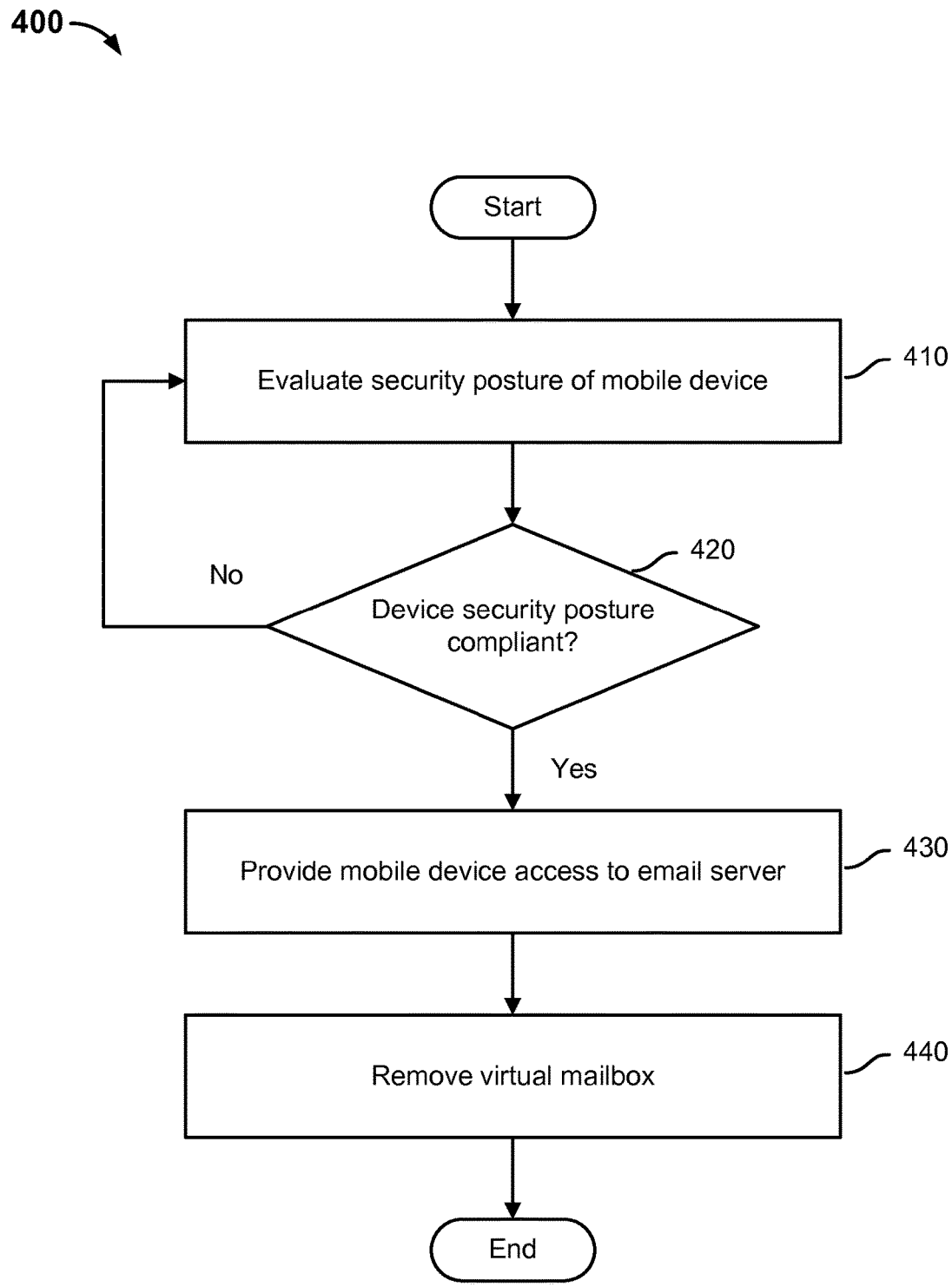
FIG. 4 is a flowchart illustrating embodiments of a process to remove a virtual mailbox.

FIG. 4 is a flowchart illustrating embodiments of a process to remove a virtual mailbox. In various embodiments, the process 400 is performed at security enforcement node 130 of FIG. 1. In some embodiments, the process 400 is performed after a security posture of a mobile device is determined to be non-compliant, after the mobile device is blocked from accessing an email server and/or other network servers, and/or after a virtual mailbox has been generated for the mobile device. At 410, a security posture of a mobile device is evaluated. In various embodiments, a proxy server may communicate with the device management server to determine a security posture of the device. In some cases, the mobile device is blocked from accessing the email server and/or network resources, and the proxy server periodically queries the device management server to determine whether the security posture of the mobile device has transitioned into a compliant state. In one example, the virtual mailbox is deployed to the mobile device using the techniques disclosed herein, and information (e.g., email message(s), calendar entries, reminders, etc.) regarding remediation actions to be performed to bring the mobile device to a secure state are provided to the virtual mailbox. The proxy server may periodically communicate with the device management platform to determine whether the remediation actions have been performed (e.g., by the device user) to bring the mobile device into a compliant state.

In various embodiments, the security posture of the mobile device is continuously monitored at the device management server. In the event that the mobile security posture transitions from a non-compliant state to a compliant state, the device management server provides an indication to the proxy server. In certain cases, the device management server provides an indication to the proxy server that the security posture of the device is compliant without receiving a request from the proxy server (e.g., not in response to a request from the proxy server).

At 420, it is determined whether the security posture of the device is compliant. In the event it is determined by the device management platform and/or proxy server that a security posture of the mobile device is compliant with, for example, policies and/or rules applicable to the mobile device, the process proceeds to step 430. In the event it is determined that the security posture of the mobile device is determined to be not compliant with a policies and/or rules applicable to the mobile device, the process proceeds to step 410 and the security posture of the mobile device is monitored.

At 430, the mobile device is provided access to the email server. In various embodiments, it is determined that a security posture of the device is compliant with one or more policies and/or rules and the mobile device is provided access to the email server. For example, it may be determined (e.g., by the device management server) that the mobile device has transitioned from a non-secure state to a secure state and/or the security posture of the mobile device is compliant with one or more policies. Based on a determination that the mobile device has transitioned to a compliant state, the proxy server provides the mobile device access to the email server and/or other network resources.

At 440, the virtual mailbox is removed. In various embodiments, the proxy server redirects the mail client from virtual mailbox to the email server and/or mailbox(es) associated therewith. In certain cases, the email client is synchronized to remove the virtual mailbox and/or replace the virtual mailbox with mailbox(es) associated with the email server. When the virtual mailbox is removed, the mobile device, proxy server, and/or email server may resume traditional email operations.

Figure 5:
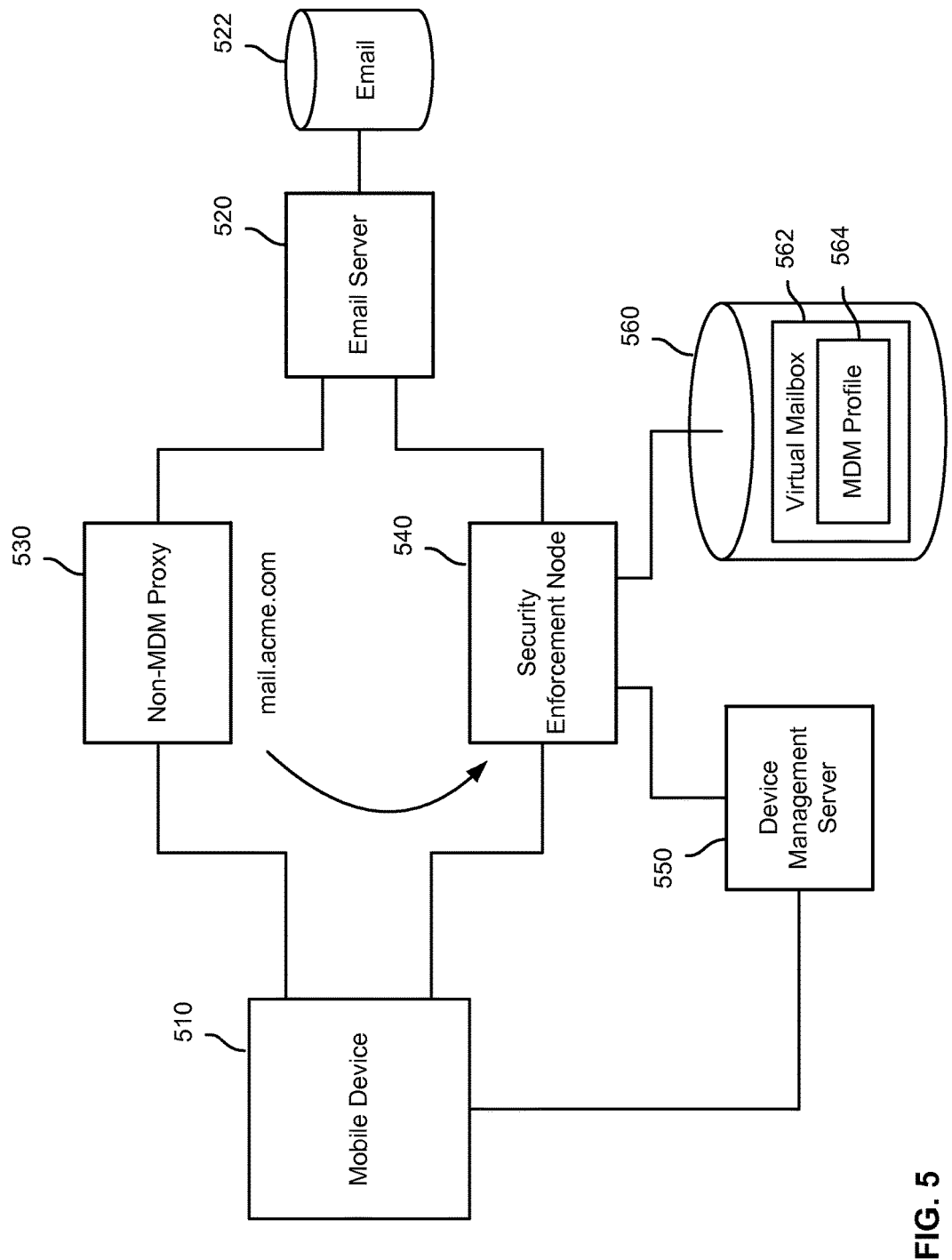
FIG. 5 is a block diagram illustrating embodiments of registering a mobile device with an MDM system.

FIG. 5 is a block diagram illustrating embodiments of registering a mobile device with an MDM system. In various embodiments, a mobile device 510 is initially configured to communicate with an email server 520 and/or mailbox(es) in an email data repository 522 associated with the mail server 520. The mobile device 510 may communicate with the email server 520 via a proxy server 530 not associated with an MDM system (a non-MDM proxy server). At a certain point in time, a user associated with the mobile device 510 may join an enterprise including an MDM system/program (e.g., a BYOD MDM program) and/or an enterprise of which the user is an employee may transition to an MDM program. Using the techniques disclosed herein, a virtual mailbox 562 is deployed to guide the user to register the mobile device 510 with the MDM system.

In various embodiments, an existing mobile device email domain name system (DNS) record is used to cut-over to a formal MDM BYOD program. For example, a user may point their mobile device email client to a server host name associated with the enterprise, such as mail.acme.com. When the MDM BYOD program is initiated for the device and/or user, the server host name may be routed (e.g., by a DNS server based on the DNS record) to a security enforcement node 540 (e.g., an MDM proxy server) that is associated with the MDM system. In certain cases, an enterprise that is deploying the MDM system may configure the DNS server to reroute/redirect packets from the mobile device email client to the email server host name to be sent to the security enforcement node 540.

In various embodiments, the security enforcement node 540 determines a registration state associated with the mobile device 510 and/or user of the mobile device. The security enforcement node 540 may, for example, communicate with the device management server 550 to determine a registration state of the mobile device 510 and/or user of the mobile device. Example registration states of the mobile device 510 include user registered with the MDM system, mobile device registered, user registered but mobile device not registered, and/or any other registration state. In some embodiments, it is determined that the mobile device user and/or mobile device 510 are not registered with the MDM program. In this case, a virtual mailbox 562 is generated for the mobile device 510 and/or the device is blocked from accessing the email server 520, such as enterprise email server. In various embodiments, the virtual mailbox 562 masks a mailbox associated with the email server 520. The virtual mailbox 562 may be generated and stored in a data storage 560 associated with the MDM proxy server 540. As discussed above, the data storage 560 associated with the MDM proxy server 540 may be separate from the email server 520.

In various embodiments, the device management server 550, the security enforcement node 540, and/or an administrator associated therewith may provide information to the virtual mailbox 562 that guides a user through the device registration process. In one example, an email message is provided to the virtual mailbox, and the email message includes an IT department's customized greeting along with instructions to complete the registration formalities. In various embodiments, the device 510 may be provided access to the email server 520 and/or other network resources upon completion of the registration process.

In various embodiments, an MDM profile 564 for the mobile device 510 is provided to the virtual mailbox 562. In one example, an MDM profile 564 is provided to the virtual mailbox 562 in an email message (e.g., an attachment to an email message), as a file, and/or other in another format. In certain cases, a user of the mobile device 510 may open an email including the MDM profile and may initiate installation of the MDM profile on the mobile device 510 by, for example, opening a file including the MDM profile. Installation of the MDM profile on the device 510 may register and/or otherwise configure the device 510 for operation with the MDM system.

According to some embodiments, an email message including a link is provided to the virtual mailbox 562. The link when clicked may launch and/or install a management agent on the mobile device 510. When launched the management agent communicates with a device management server 550 to register the mobile device with the MDM system. In certain cases, a link in an email message may point to the device management server 550, and the link may initiate an agent-less registration process for the mobile device 510. In this case, the mobile device 510 may be configured for operation in an MDM environment with use of agent on the mobile device.

In some embodiments, a user owns multiple mobile devices. In this case, one or more of the mobile devices that are registered with the MDM system are provided access to the email server 520. The user's other device(s) that are not registered may not be provided access to the email server 520 and/or may be presented a virtual mailbox 562. In certain cases, a determination to generate a virtual mailbox and/or block user access to the email server is made based on a registration state of user, a registration state of a particular device associated with the user, and/or other parameters. By way of example, a user may own multiple devices including, for example, a smartphone (e.g., an iPhone™), a tablet (e.g., an Android™ tablet), and/or other devices. The user may have previously registered the tablet device for operation in the MDM system using the techniques disclosed herein, and the tablet is provided access to the email server 520 via the security enforcement node 540. The user may attempt to access the email server 520 using the smartphone, and it may be determined that the smartphone is not registered with the MDM system. Based on the determination that the smartphone is not registered, a virtual mailbox is generated for the smartphone and/or the smartphone is blocked access to the email server 520. The virtual mailbox may be customized to the user and/or attributes associated with the smartphone. The virtual mailbox may include, for example, information to guide the user through the MDM registration process for the smartphone. Once the registration process is completed for the smartphone, the smartphone and/or email client associated therewith is provided access to the email server 520.

Figure 6:
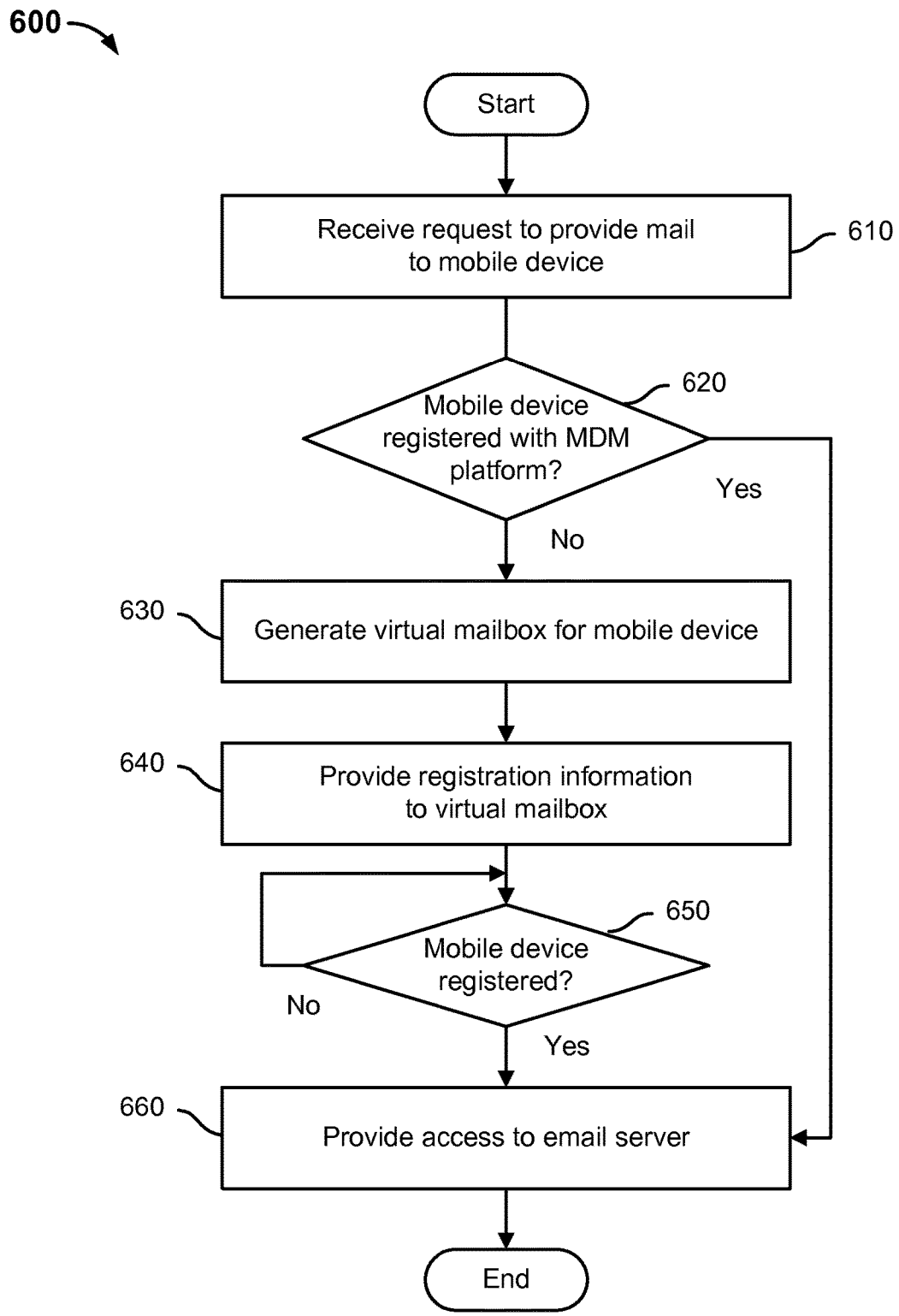
FIG. 6 is a flowchart illustrating embodiments of a process of registering a mobile device with an MDM system.

FIG. 6 is a flowchart illustrating embodiments of a process of registering a mobile device with an MDM system. In various embodiments, the process 600 is performed at security enforcement node 130 of FIG. 1. At 610, a request to provide mail to a mobile device is received. In some embodiments, a request to provide mail is received from a mobile device and/or an email client associated with a mobile device.

At 620, it is determined whether the mobile device is registered with the MDM platform. In various embodiments, the proxy server communicates with a device management server to determine whether the mobile device is registered with the MDM platform. In certain cases, the device management server maintains a data structure including information indicating a registration state for each of multiple devices and/or users associated with the mobile devices. The device management server may query the data structure to determine if the mobile device and/or user associated therewith are registered with the MDM platform. The mobile device management server provides the proxy server information indicating whether or not the mobile device is registered with the MDM platform. In the event it is determined that the mobile device is registered with the MDM platform, the process proceeds to step 660. In the event it is determined that the mobile device is not registered with the MDM platform, the process proceeds to step 630.

At 630, a virtual mailbox is generated for the mobile device. In various embodiments, the virtual mailbox is generated using any of the techniques disclosed herein and/or known in the art. In certain cases, the virtual mailbox is generated to guide a mobile device user through a process to register the mobile device with the MDM platform.

At 640, registration information is provided to the virtual mailbox. In various embodiments, registration information includes information to guide a user through the mobile device registration process. In one example, an email message including an IT department greeting and/or an attached document providing the user instructions to complete the registration formalities is added to the virtual mailbox. In another example, a file including an MDM profile is added to the virtual mailbox. And when the user downloads the file, the MDM profile is installed on the device and the device is registered with the MDM platform.

At 650, it is determined whether the mobile device is registered with the MDM platform. In various embodiments, the proxy server, a device management server, and/or other node monitors a registration state of the mobile device. For example, the device management server may detect when a mobile device registers with the MDM platform. In the event that it is determined that the mobile device is not registered with the MDM platform, the proxy server, device management server, and/or other nodes continue to monitor the registration state of the mobile device. In the event it is determined that the mobile device is registered, the process proceeds to step 660.

At 660, the mobile device is provided access to the email server. In various embodiments, the proxy server redirects the mobile device email client from the virtual mailbox to a mailbox associated with the email server. In this case, the mobile device may be provided full email functionality associated with the email server mailbox. In some embodiments, the virtual mailbox is removed, and the virtual mailbox is removed from the email client at, for example, a next synchronization with the email server.

Figure 7:
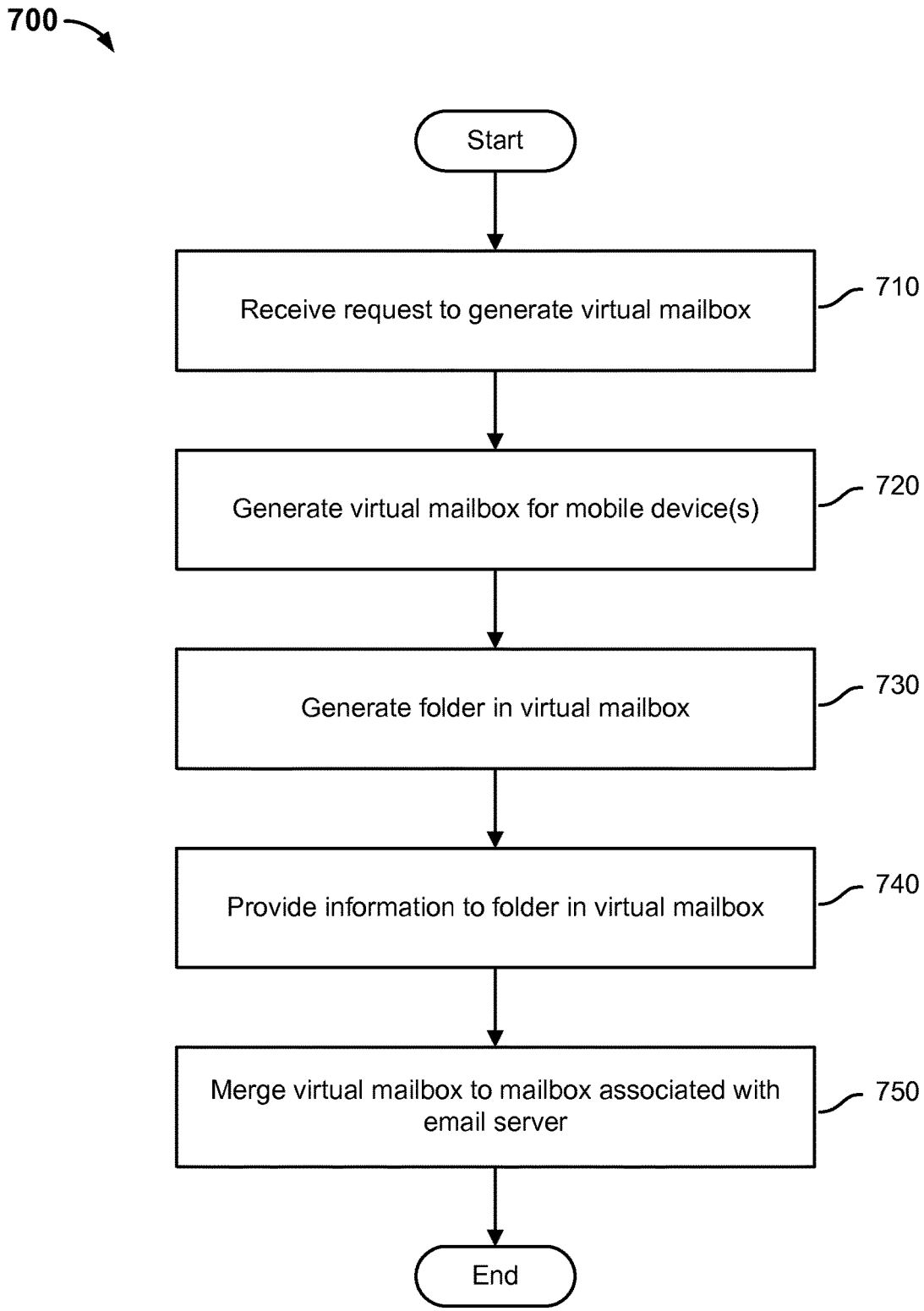
FIG. 7 is a flowchart illustrating embodiments of a process to registering a mobile device with an MDM system.

FIG. 7 is a flowchart illustrating embodiments of a process to registering a mobile device with an MDM system. In various embodiments, the process 700 is performed at security enforcement node 130 of FIG. 1. At 710, a request is received to generate a virtual mailbox. In various embodiments, a proxy server receives a request from a mobile device management server to generate a virtual mailbox for one or more mobile devices. In certain cases, a request is received to generate a virtual mailbox for a particular device and/or user. In some cases, a request is received to generate a virtual mailbox for a set of multiple mobile devices.

At 720, a virtual mailbox is generated for mobile device(s). In various embodiments, a virtual mailbox may be generated for one mobile device, multiple mobile devices associated with a user, and/or a group of mobile devices (e.g., associated with different users). In some cases, a user may have multiple devices, such as a smartphone, a tablet, a second smartphone, and/or other devices. In one example, one virtual mailbox is generated for all of the user's multiple devices. The virtual mailbox may be configured based on the user's language preference(s), device type, locality, role within an enterprise, group membership, and/or other information. In another example, a separate virtual mailbox for each of the user's mobile devices. The virtual mailbox for each device may be configured based on parameters associated with the mobile device, the email client operating on the device, and/or other information.

In some embodiments, a device management server and/or administrator associated therewith determines that virtual mailboxes are to be generated for a set of mobile devices. The set of mobile devices may be, for example, associated with a group, such as an enterprise group, a department, a set of employee(s) at certain level, and/or other group. The virtual mailboxes for each member of the group may be configured based on the member's language preference(s), device type, locality, role within an enterprise, and/or other information. The virtual mailboxes may be generated (as discussed below) to share information with the members of the group.

In various embodiments, the virtual mailbox is dynamic and/or customized to a user and the device the user is using to access the network. For example, a proxy server and/or device management server may evaluate the email usage habits of a user and generate a virtual mailbox based on the user's habits. Email usage habits may include, for example, a frequency at which the user checks email; a frequency at which a user reads, responds to, and/or otherwise interacts with email on a certain device; which devices the user uses to check email at certain times (e.g., during the work day, at night, etc.); and/or any other email usage habits. These habits are evaluated and used to generate a virtual mailbox. In one example, it is determined that a user owns two mobile devices—a smartphone and a tablet—and the user mainly checks email using the smartphone. In this case, a virtual mailbox to provide the user important enterprise information may be generated for the smartphone and not the tablet device. Generating the virtual mailbox for the smartphone may allow the enterprise to deliver timely information and guidance on the user's device which is being used to access information, instead of sending a mail to a traditional inbox which may require another medium/device to access the content.

At 730, a folder is generated in the virtual mailbox. In various embodiments, a network-based folder (e.g., a VIP folder), a files folder and/or other type of folder is generated for each of one or more users in the virtual mailbox.

At 740, information is provided to a folder in a virtual mailbox. In various embodiments, a virtual mailbox for user and/or device includes a network-based VIP folder. In certain cases, the network-based VIP folder is used to provide information to a user, such as enterprise news, documents, links to network resources, and/or other information. For example, the VIP folder may include messages (emails) tagged as important by the IT department, messages tagged based on a policy configured by a user (e.g., a topic, subject, group, etc. to which the user subscribes), and/or any other messages. In some embodiments, the folder can be used with or without an email server-associated mailbox. The folder may be used without the email server-associated mailbox when, for example, the email server-associated mailbox is in a blocked state for the user and/or device.

In various embodiments, a virtual mailbox may include a files folder. The files folder may be used to deliver files from a network share that is mapped by the administrator. In one example, the files folder can be used to provide information to a user even when the device is compliant and is connected to a mailbox associated with an email server. In another example, the files folder may include a virtual folder injected into the real mailbox when the user is accessing the real mailbox through a specific device. In this case, even if the specific device does not support an email server's advanced functionality, files can be delivered to the device and made available to user in the files folder in the virtual mailbox.

At 750, the virtual mailbox is merged to a mailbox associated with an email server. In various embodiments, a virtual mailbox is merged with a mailbox associated with an email server such that content from both of the mailboxes—the virtual mailbox and email server-associated mailbox—appear in the same view (e.g., inbox, folders, etc.). In some cases, from the perspective of the email client, the virtual mailbox may be indistinguishable from the email server-associated mailbox. In some embodiments, the virtual mailbox is merged with the email server-associated mailbox by generating a folder within the email server-associated mailbox that includes the contents of the virtual mailbox. In certain cases, the folder may be labeled VIP folder, files folder, enterprise messages, and/or any other name that identifies the folder as being associated with a virtual mailbox.

According to some embodiments, this step is not performed and the virtual mailbox is not merged with a mailbox associated with the email server. In this case, the virtual mailbox may be a separate mailbox displayed in an email client.

Figure 8:
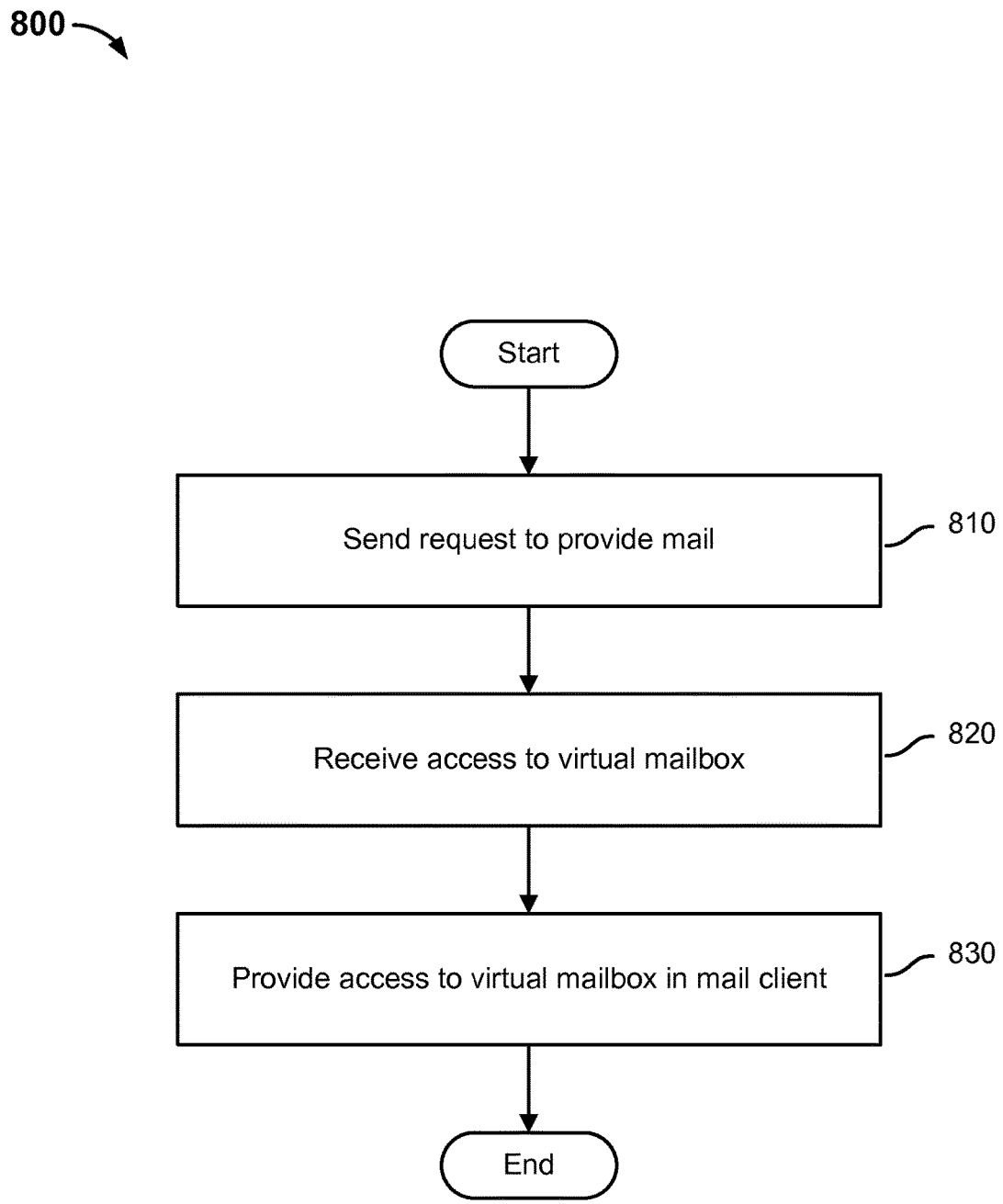
FIG. 8 is flowchart illustrating embodiments of a process to provide access to a virtual mailbox on a mobile device.

FIG. 8 is flowchart illustrating embodiments of a process to provide access to a virtual mailbox on a mobile device. In various embodiments, the process 800 is performed at mobile 110 of FIG. 1. At 810, a request for mail is sent from a mobile device to an email server. In various embodiments, a request to provide mail is sent from an email client on a mobile device to an email server via a proxy server. The request to provide mail may include, for example, a request to retrieve mail from a mailbox associated with the email server, a request to synchronize the email client with the mailbox, an outgoing email message, and/or any other email protocol-related request.

In various embodiments, the proxy server receives the request and determines based on the request that a virtual mailbox is to be generated for the device. For example, the proxy server may receive a request to provide mail, communicate with a device management server to determine whether the mobile device is validated to access the email server, receive an indication that the mobile device is not validated for access to the email server, and/or generate a virtual mailbox based on the indication that the mobile device is not validated to access the email server. In another example, a proxy server may receive a request to provide mail, determine that the mobile device is not registered with an MDM system (e.g., based on communications with a mobile device management server), and/or generate a virtual mailbox to provide device registration instructions to a user of the mobile device.

At 820, the mobile device receives access to the virtual mailbox. In various embodiments, the reverse proxy server points the mobile device (email client) to the virtual mailbox and simulates the behavior of an email server providing any of the functionality that a traditional email server provides. In various embodiments, the email client synchronizes with the virtual mailbox. In one example, the reverse proxy commands the email client to synchronize with the virtual mailbox. In another example, the email client initiates synchronization with the virtual mailbox automatically, according to a schedule, based on input from a user, and/or using another approach. In some embodiments, when a mobile device synchronizes with a virtual mailbox, the virtual mailbox replaces and/or masks a mailbox associated with an email server. In one example in which the security posture of the mobile device indicates the device is not compliant with a policy, the contents of mailboxes associated with an email server are removed from the email client and replaced with the virtual mailbox. In this case, the mobile device may be blocked from accessing a mailbox(es) associated with the email server.

At 830, access is provided to the virtual mailbox at an email client on the mobile device. In various embodiments, the virtual mailbox as presented on the mobile device includes attributes that are substantially similar to attributes of a mailbox associated with the email server. Attributes may include, for example, a manner in which messages are displayed, a layout of content in the email client, a size of font used in content, language(s) used to display content, and/or any other attributes associated with the display of the mailbox. In some cases, the virtual mailbox may appear to be substantially identical to the mailbox associated with the email server and/or may include similar and/or identical functionality to the mailbox associated with the email server. Similar to a mailbox associated with the email server, the user may open messages in the virtual mailbox, reply to messages in the virtual mailbox, send messages from the virtual mailbox, access a calendar associated with the virtual mailbox, and/or perform any other email-related operations.

In some embodiments, a virtual mailbox and/or proxy server hosting the virtual mailbox may limit certain email-related functionality. In one example, when a user attempts to send an email from an unsecure device, the virtual mailbox can be configured to notify the user with an "undeliverable" message. The undeliverable message may explain why the message was blocked and/or remind a user of steps to regain full email access. In another example, a user searches for contacts in an address book, and the virtual mailbox may deliver to the user suggestive names like "Device Blocked" for all searches.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving, at a proxy server associated with an email server, a request to provide mail to a mobile device;

receiving, at the proxy server, security posture data associated with the mobile device, wherein the security posture data indicates whether the mobile device is compliant with one or more policies associated with a group of mobile devices;

in the event the security posture data indicates that the mobile device is not compliant with one or more policies associated with a group of mobile devices:

generating, by the proxy server based at least in part on the received security posture data, a virtual mailbox for the mobile device, wherein the virtual mailbox is stored in a location separate from the email server; and providing the mobile device access to the virtual mailbox, wherein the virtual mailbox as presented on the mobile device includes one or more functions that are available for a mailbox associated with the email server; and in the event the security posture data indicates that the mobile device is compliant with one or more policies associated with a group of mobile devices:

providing the mobile device with access to the mailbox associated with the email server; and removing the virtual mailbox for the mobile device in the event the security posture data of the mobile device changed from being not compliant to compliant.

2. The method of claim 1, further comprising receiving from a device management server a request to block access to the email server.

3. The method of claim 2, wherein the request to block access is generated based on a security posture associated with the mobile device.

4. The method of claim 1, further comprising:

blocking the mobile device access to the mailbox associated with the email server.

5. The method of claim 1, wherein the request to provide mail includes a request from a mobile device management server to generate the virtual mailbox.

6. The method of claim 5, wherein generating the virtual mailbox further includes:

generating a folder in the virtual mailbox; and providing information to the folder in the virtual mailbox.

7. The method of claim 1, further comprising:

merging the virtual mailbox with the mailbox associated with the email server.

8. The method of claim 1, further comprising:

communicating, based at least in part on the request to provide mail, with a device management server to validate the mobile device to access the email server.

9. The method of claim 8, wherein the device management server is configured to perform the steps of:

determining a security posture of the mobile device;

determining that the security posture of the mobile device is not compliant with a policy applicable to the mobile device; and sending to the proxy server a request to generate the virtual mailbox based at least in part on the determination that the security posture is not compliant.

10. The method of claim 9, wherein:
generating the virtual mailbox comprises generating the virtual mailbox based at least in part on the request to generate the virtual mailbox received from the device management server.

11. The method of claim 1, wherein the request to provide mail includes a request to access an enterprise email server, and further comprising:
determining, based at least in part on the request to access the enterprise email server, that the mobile device is not registered to access the enterprise mail server.

12. The method of claim 11, wherein generating the virtual mailbox includes generating the virtual mailbox based at least in part on the determination that the mobile device is not registered to access the enterprise mail server.

13. The method of claim 12, further comprising:
providing registration information to the virtual mailbox.

14. The method of claim 12, further comprising:
receiving an indication that the mobile device is registered to access the enterprise mail server;
removing the virtual mailbox based at least in part on the indication that the mobile device is registered; and
providing the mobile device access to the mailbox associated with the email server.

15. The method of claim 1, further comprising:
receiving, from a second mobile device associated with a same user as the mobile device, a second request to provide mail to the second mobile device; and
providing the second mobile device access to the mailbox associated with the email server based at least in part on a determination that the second mobile device satisfies at least one policy applicable to the second mobile device.

16. The method of claim 1, wherein the mobile device is configured to perform the steps of:
sending a request for mail;
receiving access to the virtual mailbox; and
providing access to the virtual mailbox at the mobile device.

17. The method of claim 1, wherein the security posture data includes one or more of a command to generate a virtual mailbox, a command to block the mobile device from access the email server, or security state information associated with the mobile device.

18. The method of claim 17, wherein the security state information is sent from the mobile device to the device management server and includes one or more of a device state, application inventory information, policy enforcement state information, and device state-related information.

19. A system, comprising:
a processor; and
a memory coupled with the processor, wherein the memory is configured to provide the processor with instructions which when executed cause the processor to:
receive, at a proxy server associated with an email server, a request to provide mail to a mobile device;
receive, at the proxy server, security posture data associated with the mobile device, wherein the security posture data indicates whether the mobile device is compliant with one or more policies associated with a group of mobile devices;
in the event the security posture data indicates that the mobile device is not compliant with one or more policies associated with a group of mobile devices:
generate, by the proxy server based at least in part on the received security posture data, a virtual mailbox for the mobile device, wherein the virtual mailbox is stored in a location separate from the email server; and
provide the mobile device access to the virtual mailbox, wherein the virtual mailbox as presented on the mobile device includes one or more functions that are available for the email server; and
in the event the security posture data indicates that the mobile device is compliant with one or more policies associated with a group of mobile devices:
provide the mobile device with access to the mailbox associated with the email server; and
remove the virtual mailbox for the mobile device in the event the security posture data of the mobile device changed from being not compliant to compliant.

20. The system recited in claim 19, wherein the request to provide mail includes a request from a device management server to generate the virtual mailbox.

21. A computer program product, the computer program product being embodied in a non-transitory computer readable storage medium and comprising computer instructions for:
receiving, at a proxy server associated with an email server, a request to provide mail to a mobile device;
receiving, at the proxy server, security posture data associated with the mobile device, wherein the security posture data indicates whether the mobile device is compliant with one or more policies associated with a group of mobile devices;
in the event the security posture data indicates that the mobile device is not compliant with one or more policies associated with a group of mobile devices:
generating, by the proxy server based at least in part on the received security posture data, a virtual mailbox for the mobile device, wherein the virtual mailbox is stored in a location separate from the email server; and
providing the mobile device access to the virtual mailbox, wherein the virtual mailbox as presented on the mobile device includes one or more functions that are available for the email server; and
in the event the security posture data indicates that the mobile device is compliant with one or more policies associated with a group of mobile devices;
providing the mobile device with access to the mailbox associated with the email server and removing the virtual mailbox for the mobile device in the event the security posture data of the mobile device changed from being not compliant to compliant.

22. The computer program product recited in claim 21, wherein the request to provide mail includes a request from a device management server to generate the virtual mailbox.

* * * * *